United States Patent
Jin et al.

(10) Patent No.: US 12,391,861 B2
(45) Date of Patent: Aug. 19, 2025

(54) CEMENT SLURRY SYSTEM, PREPARATION METHOD THEREFOR AND USE THEREOF

(71) Applicants: China National Petroleum Corporation, Beijing (CN); CNPC Engineering Technology R&D Company Limited, Beijing (CN)

(72) Inventors: Jianzhou Jin, Beijing (CN); Yuchao Guo, Beijing (CN); Hong Yue, Chengdu (CN); Youcheng Zheng, Chengdu (CN); Hua Zhang, Beijing (CN); Lili Chen, Chengdu (CN); Shuoqiong Liu, Beijing (CN); Wei Li, Chengdu (CN); Yong Ma, Chengdu (CN); Feng Zhou, Chengdu (CN); Chengquan Li, Chengdu (CN); Yao Wang, Chengdu (CN); Yongjin Yu, Beijing (CN); Congfeng Qu, Beijing (CN); Fengzhong Qi, Beijing (CN); Yong Li, Beijing (CN); Youzhi Zheng, Chengdu (CN); Jianhua Guo, Chengdu (CN); Ming Xu, Beijing (CN); Zhaohui Wang, Beijing (CN); Chi Zhang, Beijing (CN); Zishuai Liu, Beijing (CN); Xiaobing Zhang, Beijing (CN); Hongfei Ji, Beijing (CN); Shunping Zhang, Beijing (CN); Rui Zheng, Beijing (CN)

(73) Assignees: China National Petroleum Corporation, Beijing (CN); CNPC Engineering Technology R&D Company Limited, Beijing (CN)

(*) Notice: Subject to any disclaimer, the term of this patent is extended or adjusted under 35 U.S.C. 154(b) by 0 days.

(21) Appl. No.: 18/571,041
(22) PCT Filed: Jun. 30, 2022
(86) PCT No.: PCT/CN2022/102831
§ 371 (c)(1),
(2) Date: Dec. 15, 2023
(87) PCT Pub. No.: WO2023/123962
PCT Pub. Date: Jul. 6, 2023

(65) Prior Publication Data
US 2024/0228858 A1   Jul. 11, 2024

(30) Foreign Application Priority Data
Dec. 30, 2021 (CN) .......................... 202111680322.1

(51) Int. Cl.
*C09K 8/467* (2006.01)
*C04B 40/00* (2006.01)
*C04B 103/50* (2006.01)

(52) U.S. Cl.
CPC .......... *C09K 8/467* (2013.01); *C04B 40/0039* (2013.01); *C04B 2103/50* (2013.01); *C04B 2201/20* (2013.01); *C04B 2201/50* (2013.01)

(58) Field of Classification Search
CPC . C09K 8/467; C04B 40/0039; C04B 2103/50; C04B 2201/20; C04B 2201/50
See application file for complete search history.

(56) References Cited

FOREIGN PATENT DOCUMENTS

CN   102225988 A  * 10/2011
CN   102321459 A    1/2012
(Continued)

*Primary Examiner* — Crystal J Lee
(74) *Attorney, Agent, or Firm* — Volpe Koenig

(57) ABSTRACT

The present disclosure relates to the technical field of oil and gas field exploitation, in particular to an early strength material suitable for a cement slurry system, a cement slurry composition, a cement slurry system, a preparation method therefor and the use thereof. The early strength material contains an aluminum salt, a sodium salt, crystal whiskers, an inorganic mineral and dispersing agent I, wherein the weight ratio of the aluminum salt, the sodium salt, the crystal whiskers, the inorganic mineral and dispersing agent I is (1-3):(1-3):(1-4):(1-8):1. The early strength material provided by the present invention has both high-temperature retarding performance and low-temperature early strength performance; meanwhile, while satisfying well cementing, the cement slurry system prepared from the cement slurry composition containing the early strength material can prolong thickening time of cement slurry under a high-tem- (Continued)

perature condition, can prevent ultra-retarding of top cement slurry under a low-temperature condition and has increased early strength.

13 Claims, 1 Drawing Sheet

(56) References Cited

FOREIGN PATENT DOCUMENTS

| | | | | |
|---|---|---|---|---|
| CN | 104327813 A | | 2/2015 | |
| CN | 104745160 A | | 7/2015 | |
| CN | 106186777 A | * | 12/2016 | ............ C04B 28/00 |
| CN | 106256871 A | * | 12/2016 | ............ C04B 28/02 |
| CN | 106986584 A | | 7/2017 | |
| CN | 112299757 A | | 2/2021 | |
| EP | 2090170 A1 | | 8/2009 | |
| RU | 2508307 C2 | | 2/2014 | |
| WO | 2004095930 A1 | | 11/2004 | |
| WO | 2013092350 A1 | | 6/2013 | |
| WO | 2018/012437 A1 | | 1/2018 | |
| WO | 2018/016780 A1 | | 1/2018 | |
| WO | 2022/160711 A1 | | 8/2022 | |

* cited by examiner

CEMENT SLURRY SYSTEM, PREPARATION METHOD THEREFOR AND USE THEREOF

CROSS REFERENCE TO RELATED APPLICATIONS

The application claims priority to Chinese Patent Application No. 202111680322.1, filed on Dec. 30, 2021, and the content of which is specifically and entirely incorporated herein by reference.

FIELD

The present disclosure relates to the technical field of oil and gas field exploitation, in particular to an early strength material suitable for a cement slurry system, a cement slurry composition, a cement slurry system, and a preparation method and a use thereof.

BACKGROUND

The well depth of the deep wells and the ultra-deep wells is continuously increasing in recent years, so the isolation sections are longer and longer (the length of a part of the isolation sections in a well is more than 6,000 m), and the top cement slurry is not solidified for a long time, thereby seriously affecting the subsequent operations. Because of the action mechanism of the high-temperature retarder, the high-temperature retarder will influence the strength development of the set cement at the top. In order to expedite the development of top set cement strength, it is often required to add an early strength material. The commonly used early strength material comprises inorganic salts and organic compounds, wherein chlorine salts in the inorganic salts are the most common oil well cement early strength material, and the carbonates, inorganic mineral, aluminates, thiosulfates and sodium hydroxide, potassium hydroxide, and ammonium hydroxide are also used as the oil well cement early strength material; the organic early strength material includes calcium formate, ammonium formate, oxalic acid, triethylamine and the like. Although the traditional early strength material has a certain early strength effect, the material still exhibits the following deficiencies:
  (1) although the conventional early strength material has an early strength effect, the cement slurry thickening time can be shortened seriously under the high-temperature condition, such that the addition amount of a retarder is increased, and the contradiction between the addition amount of the early strength agent and the addition amount of the retarder is triggered;
  (2) the conventional early strength material is usually a chlorine-salt-containing composite material, which is prone to cause the high-temperature strength decline of set cement;
  (3) a part of the conventional early strength material is an ultrafine mineral material, the addition amount is large, the ash discharge time is influenced, and the cement slurry thickening curve is easy to "bulge" and "raise steps";
  (4) the conventional early strength material has little effect on the development of the cement slurry early strength at low temperature at the top of the long sealing section.

Therefore, it is extremely necessary to develop a large-temperature-difference cement slurry system that can prolong the cement slurry thickening time, improve the early strength of the top set cement, and have no influence on conventional properties (e.g., rheological property, water loss) of the cement slurry under the high temperature, thereby improving the well cementation quality and ensuring the efficient development of the deep stratum oil and gas resources.

SUMMARY

The present disclosure aims to overcome the problems concerning the short thickening time under the high temperature, the ultra-retarding of cement slurry under the low temperature, low early strength, and low rheological property of the existing cement slurry system, and provides a new early strength material for a cement slurry system, a new cement slurry composition, a new cement slurry system and a preparation method and a use thereof, wherein the early strength material has both high-temperature retarding performance and low-temperature early strength performance; the cement slurry system containing the early strength material can prolong thickening time of cement slurry under a high-temperature condition and prevent ultra-retarding of top cement slurry under a low-temperature condition on the premise of meeting well cementation construction, and effectively improve early strength of the cement slurry system.

To achieve the above purposes, the first aspect of the present disclosure provides an early strength material suitable for a cement slurry system containing an aluminum salt, a sodium salt, a crystal whisker, an inorganic mineral, and a dispersing agent I;
  wherein the weight ratio of the aluminum salt, the sodium salt, the crystal whisker, the inorganic mineral and the dispersing agent I is (1-3):(1-3):(1-4):(1-8):1.

A second aspect of the present disclosure provides a cement slurry composition comprising: 100 parts by weight of cement, 1-5 parts by weight of an early strength material, 0.5-40 parts by weight of a strength stabilizer, 0-120 parts by weight of a density modifier, 0-2 parts by weight of a suspension stabilizer, 0-2 parts by weight of a dispersing agent II, 2-5 parts by weight of a filtrate reducer, 0.1-2 parts by weight of a retarder, 0.1-0.5 part by weight of a defoaming agent and 40-80 parts by weight of water;
  wherein the early strength material is the early strength material provided in the first aspect.

A third aspect of the present disclosure provides a cement slurry system prepared from the cement slurry composition of the second aspect.

A fourth aspect of the present disclosure provides a method of preparing the cement slurry system comprising the following steps:
  (1) subjecting cement, an early strength material, a strength stabilizer, a density modifier, a suspension stabilizer, and a dispersing agent II to first mixing to obtain a dry blend;
  (2) subjecting a filtrate reducer, a retarder, a defoaming agent, and water to second mixing to obtain a wet blend;
  (3) adding the dry blend into the wet blend under low-speed stirring, then stirring obtained mixture at high-speed to prepare a cement slurry system;
  wherein the early strength material is the early strength material provided in the first aspect.

The fifth aspect of the present disclosure provides a use of the cement slurry system provided by the third aspect, or the cement slurry system prepared with the method provided by the fourth aspect in the high temperature deep well cementing, and the long isolation section cementing under a large temperature difference condition.

Compared with the prior art, the present disclosure has the following advantages:

(1) the early strength material provided by the present disclosure has both high-temperature retarding performance and low-temperature early strength performance by limiting the weight ratios of an aluminum salt, a sodium salt, a crystal whisker, an inorganic mineral and a dispersing agent I in the early strength material and performing the synergy among the ingredients; by adding the dispersing agent I into an early strength material, the rheological property of the cement slurry can be effectively adjusted, the thickening experimental curve of the cement slurry is adjusted, and abnormal phenomena such as "bulging" and "raising step" are avoided;

(2) the cement slurry composition provided by the present disclosure can effectively coordinate the direct synergistic effect of ingredients in the composition, by limiting a specific early strength material and combining specific parts by weight of cement, an early strength material, a strength stabilizer, a density modifier, a suspension stabilizer, a dispersing agent II, a filtrate reducer, a retarder, a defoaming agent and water, the cement slurry system prepared from the composition can extend the thickening time of cement slurry under the high-temperature condition, and can avoid the ultra-retarding of top cement slurry under the low-temperature, on the premise of meeting the requirements of well cementation construction (i.e., the cement slurry system has a fluidity more than or equal to 22 cm; an API water loss less than 50 mL; a free water content being 0), such that the early strength of the cement slurry system is improved.

(3) the cement slurry system provided by the present disclosure has the characteristics of prolonging the thickening time of the cement slurry under the high-temperature condition and preventing the ultra-retarding of the cement slurry under the low-temperature condition, improving the early strength performance of set cement, and having no adverse effect on the rheological property, water loss, stability and the like of the cement slurry, and can ensure the well cementation quality of the high temperature deep well cementing, and the long isolation section cementing under a large temperature difference condition.

DETAILED DESCRIPTION

Figure 1:
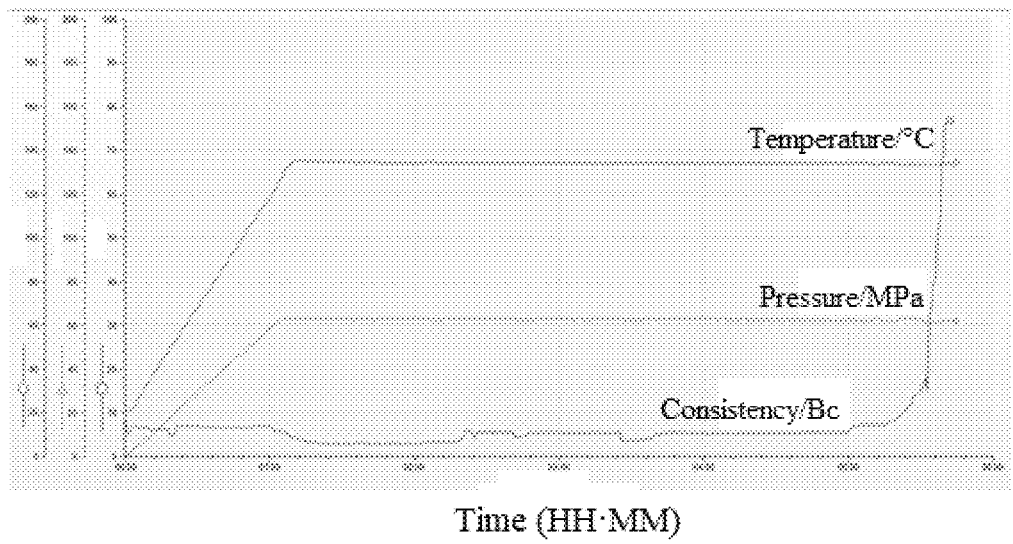
FIG. 1 illustrates a thickening curve of the cement slurry system S1 prepared in Example 1.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined to produce one or more new numerical ranges, which should be deemed have been specifically disclosed herein.

Unless otherwise specified in the present disclosure, the expressions "first" and "second" neither indicate the sequence, nor impose the limiting effect on the individual step or material, the expressions merely serve to distinguish the individual step or material; for example, the expressions "first" and "second" in the terms "first mixing" and "second mixing" are used only to distinguish the two mixing processes, and indicate that they are not the same mixing process.

In the first aspect, the present disclosure provides an early strength material suitable for a cement slurry system containing an aluminum salt, a sodium salt, a crystal whisker, an inorganic mineral, and a dispersing agent I;

wherein the weight ratio of the aluminum salt, the sodium salt, the crystal whisker, the inorganic mineral and the dispersing agent I is (1-3):(1-3):(1-4):(1-8):1.

In some embodiments of the present disclosure, preferably, the weight ratio of the aluminum salt, the sodium salt, the crystal whisker, the inorganic mineral and the dispersing agent I is (1-2):(1-2):(1-4):(1-5):1. The adoption of the preferred weight ratio is more beneficial to improving the high-temperature retarding performance and the low-temperature early strength performance of the early strength material.

The present disclosure has a wide range of choices for the preparation method of the early strength material, as long as the weight ratio parameters of the ingredients in the early strength material satisfy the above-mentioned limitations.

In a specific embodiment of the present disclosure, the aluminum salt, the sodium salt, the crystal whisker, the inorganic mineral, and the dispersing agent I are uniformly mixed in a stirring device according to the weight ratio of (1-3):(1-3):(1-4):(1-8):1, preferably the weight ratio of (1-2):(1-2):(1-4):(1-5):1, in order to obtain the early strength material.

In some embodiments of the present disclosure, the aluminum salt is preferably at least one selected from the group consisting of aluminum silicate, aluminum nitrate, aluminum chloride, aluminum sulfate, and aluminum trichloride.

In some embodiments of the present disclosure, the sodium salt is preferably at least one selected from the group consisting of sodium fluoride, sodium silicate, sodium metasilicate, sodium sulfate, sodium thiosulfate, sodium carbonate, sodium aluminate, sodium fluorosilicate, sodium oxalate, sodium hexametaphosphate, sodium tripolyphosphate, and sodium nitrate.

In some embodiments of the present disclosure, the crystal whisker is preferably at least one selected from the group consisting of calcium carbonate crystal whisker, alumina crystal whisker, calcium sulfate crystal whisker, silicon nitride crystal whisker, and magnesium sulfate crystal whisker.

In some embodiments of the present disclosure, preferably, the inorganic mineral is two materials selected from the group consisting of kaolin, feldspar, zeolite, halloysite, spinel, montmorillonite, slag, and fly ash; further preferably, the weight ratio of the two materials selected from the group consisting of kaolin, feldspar, zeolite, halloysite, spinel, montmorillonite, slag and fly ash in the inorganic mineral is (0.5-2):1, for example, 0.5:1, 1:1, 1.5:1, 2:1, and any value within the range consisting of any two numerical values.

In a specific embodiment of the present disclosure, the inorganic mineral comprises material I and material II, and the weight ratio of material I to material II is (0.5-2):1, wherein material I and material II are each independently at least one selected from the group consisting of kaolin, feldspar, zeolite, halloysite, spinel, montmorillonite, slag and fly ash, in addition, the material I and the material II are not the same at the same time.

In some embodiments of the present disclosure, preferably, the dispersing agent I is an aldehyde ketone dispersant and a polycarboxylic acid dispersant; further preferably, the weight ratio of the aldehyde ketone dispersant to the polycarboxylic acid dispersant in the dispersing agent I is (0.5-2):1, such as 0.5:1, 1:1, 1.5:1, 2:1, and any value within the range consisting of any two numerical values. In the present disclosure, the aldehyde ketone dispersant includes, but is not limited to, sulfonated aldehyde ketone polycondensate; the polycarboxylic acid dispersant includes, but is not limited to, methyl allyl alcohol polyoxyethylene ether-acrylic acid; both the sulfonated aldehyde ketone polycondensate and the methyl allyl alcohol polyoxyethylene ether-acrylic acid are commercially available, the content will not be further described in the present disclosure.

In the present disclosure, compared with the dispersing agent I which is an aldehyde ketone dispersant and a polycarboxylic acid dispersant, when the dispersing agent I is only composed of an aldehyde ketone dispersant, and the aldehyde ketone dispersant is used in the cement slurry system as the early strength material of the dispersing agent I, the high-temperature retarding effect of the cement slurry system is not obvious; when the same thickening time is required, more retarder shall be added, such that the low-temperature early strength effect of the cement slurry is also weakened; the rheological property of the cement slurry is degraded, and the thickening curve exhibits the phenomena of "bulging" and "raising step".

In a second aspect, the present disclosure provides a cement slurry composition comprising: 100 parts by weight of cement, 1-5 parts by weight of an early strength material, 0.5-40 parts by weight of a strength stabilizer, 0-120 parts by weight of a density modifier, 0-2 parts by weight of a suspension stabilizer, 0-2 parts by weight of a dispersing agent II, 2-5 parts by weight of a filtrate reducer, 0.1-2 parts by weight of a retarder, 0.1-0.5 part by weight of a defoaming agent and 40-80 parts by weight of water;

wherein the early strength material is the early strength material provided in the first aspect.

In some embodiments of the present disclosure, preferably, the cement slurry composition comprising: 100 parts by weight of the cement, 1-3 parts by weight of the early strength material, 0.5-30 parts by weight of the strength stabilizer, 0-120 parts by weight of the density modifier, 0-1.5 parts by weight of the suspension stabilizer, 0-1 part by weight of the dispersing agent II, 2-4 parts by weight of the filtrate reducer, 0.1-1.5 parts by weight of the retarder, 0.1-0.5 part by weight of the defoaming agent and 40-80 parts by weight of water. By adopting the preferable conditions, the cement slurry thickening time can be significantly prolonged under the high-temperature, and used amount of retarder is reduced; the early strength of the top set cement is effectively improved, the ultra-retarding is avoided, and the cement slurry has desirable rheological property and small thixotropy, the "bulging" and "raising step" phenomena in the thickening curve is prevented.

In some embodiments of the present disclosure, the cement is preferably G-grade oil well cement, more preferably high sulphate-resistant G-grade oil well cement.

In some embodiments of the present disclosure, preferably, the particle size distribution of the strength stabilizer is more than or equal to 600 mesh, more preferably within a range from 600 mesh to 2,400 mesh; the strength stabilizer has a $SiO_2$ content larger than 99 wt. %, more preferably within a range from 99.1 wt. % to 100 wt. %.

In the present disclosure, the strength stabilizer is used for reducing the content of $Ca(OH)_2$ in the set cement and the Ca/Si ratio (Ca/Si) in the set cement, preventing the set cement from strength retrogression under the high-temperature. Preferably, the strength stabilizer is at least one selected from the group consisting of acid-washed quartz sand, refined quartz sand, and high-purity quartz sand.

In the present disclosure, the density modifier serves to adjust the density of the cement slurry system to meet the density requirement of the cement slurry system under different working conditions. Preferably, the density modifier is concentrate iron powder having a density within a range from 5.05 $g/cm^3$ to 7.2 $g/cm^3$.

In some embodiments of the present disclosure, preferably, the suspension stabilizer is selected from a modified starch stabilizer and/or a biopolymer stabilizer. In the present disclosure, the modified starch stabilizer includes, but is not limited to, carboxymethyl starch; the biopolymer stabilizer includes, but is not limited to, xanthan gum; wherein both the carboxymethyl starch and the xanthan gum are commercially available, the content will not be further described herein.

In some embodiments of the present disclosure, preferably, the dispersing agent II is at least one selected from the group consisting of an aldehyde ketone dispersant, a polycarboxylic dispersant, a formaldehyde acetone polycondensate, and a polystyrene sulfonate, preferably a formaldehyde acetone polycondensate and/or a polystyrene sulfonate. In the present disclosure, the polystyrene sulfonate includes but is not limited to, sodium polystyrene sulfonate, wherein the sodium polystyrene sulfonate is commercially available, the content will not be repeatedly described herein.

In some embodiments of the present disclosure, preferably, the filtrate reducer is a polyacrylamide polymer. In the present disclosure, the polyacrylamide polymer includes, but is not limited to, AMPS copolymer (i.e., acrylic acid-2-acrylamide-2-methylpropanesulfonic acid copolymer); wherein the AMPS copolymer is commercially available, the content will not be repeatedly described herein.

In some embodiments of the present disclosure, preferably, the retarder is an acrylamide-based polymer. In the present disclosure, the acrylamide-based polymer includes, but is not limited to, AMPS/IA copolymer (i.e., 2-acrylamido-2-methylpropanesulfonic acid/itaconic acid copolymer); wherein the AMPS/IA copolymer is commercially available, the content will not be repeatedly described herein.

In some embodiments of the present disclosure, preferably, the defoaming agent is at least one selected from the group consisting of tributyl phosphate, polyoxypropylene glycerol, and polydimethylsiloxane; wherein each of the tributyl phosphate, polyoxypropylene glycerol, and polydimethylsiloxane is commercially available, the content will not be further described herein.

In a third aspect, the present disclosure provides a cement slurry system prepared from the composition provided by the second aspect.

According to the present disclosure, the cement slurry system has an applicable temperature within a range from 30° C. to 150° C., and a temperature difference within a range from 30° C. to 120° C.

Unless otherwise specified in the present disclosure, the applicable temperature parameter refers to a static temperature of the thickening properties; the temperature difference parameter refers to the difference between the static temperature of the thickening properties and the top temperature of the compressive strength.

According to the present disclosure, preferably, the cement slurry system has a density within a range from 1.9 g/cm³ to 2.4 g/cm³; a fluidity more than or equal to 22 cm, preferably from 22 cm to 24 cm; an API water loss less than 50 mL; a free water content being 0; the top set cement compressive strength after 24 hours being more than or equal to 3 MPa, preferably more than or equal to 5 MPa; and the thickening time more than or equal to 180 min, preferably within a range from 180 min to 400 min.

Unless otherwise specified in the present disclosure, each of the thickening properties parameter, a fluidity parameter, an API water loss parameter, a free water content parameter, a sedimentation stability parameter and a compressive strength parameter is measured according to the National Standard GB/T 19139-2012 of China, namely "Testing method of well cements".

According to a particularly preferred embodiment of the present disclosure, a cement slurry system is prepared from a cement slurry composition comprising: 100 parts by weight of cement, 1-5 parts by weight of an early strength material, 0.5-40 parts by weight of a strength stabilizer, 0-120 parts by weight of a density modifier, 0-2 parts by weight of a suspension stabilizer, 0-2 parts by weight of a dispersing agent II, 2-5 parts by weight of a filtrate reducer, 0.1-2 parts by weight of a retarder, 0.1-0.5 part by weight of a defoaming agent and 40-80 parts by weight of water;
  wherein the early strength material contains an aluminum salt, a sodium salt, a crystal whisker, an inorganic mineral, and a dispersing agent I; the weight ratio of the aluminum salt, the sodium salt, the crystal whisker, the inorganic mineral and the dispersing agent I is (1-2):(1-2):(1-4):(1-5):1;
  wherein the dispersing agent I is formed by mixing an aldehyde ketone dispersant with a polycarboxylic acid dispersant according to a weight ratio of (0.5-2):1.

In a fourth aspect, the present disclosure provides a method of preparing the cement slurry system comprising the following steps:
  (1) subjecting cement, an early strength material, a strength stabilizer, a density modifier, a suspension stabilizer, and a dispersing agent II to first mixing to obtain a dry blend;
  (2) subjecting a filtrate reducer, a retarder, a defoaming agent, and water to second mixing to obtain a wet blend;
  (3) adding the dry blend into the wet blend under a low-speed stirring, then stirring obtained mixture at a high-speed to prepare a cement slurry system;
  wherein the early strength material is the early strength material provided by the first aspect.

In some embodiments of the present disclosure, the weight ratio of the cement, the early strength material, the strength stabilizer, the density modifier, the suspension stabilizer and the dispersing agent II in step (1) is preferably 100:(1-5):(0.5-40):(0-120):(0-2):(0-2), more preferably 100:(1-3):(0.5-30):(0-120):(0-1.5):(0-1).

The present disclosure has a wide selection range for the first mixing manner, as long as the cement, the early strength material, the strength stabilizer, the density modifier, the suspension stabilizer, and the dispersing agent II are uniformly mixed according to the weight ratio to obtain the dry blend.

In some embodiments of the present disclosure, the weight ratio of the filtrate reducer, the retarder, the defoaming agent and water in step (2) is preferably (2-5):(0.1-2):(0.1-0.5):(40-80), more preferably (2-4):(0.1-1.5):(0.1-0.5):(40-80).

In the present disclosure, the second mixing mode has a wide selection range, as long as the filtrate reducer, the retarder, the defoaming agent, and water are uniformly mixed according to the weight ratio to obtain a wet blend.

In some embodiments of the present disclosure, the weight ratio of the cement in the dry blend to the filtrate reducer in the wet blend in step (3) is preferably 100:(2-5), more preferably 100:(2-4).

In some embodiments of the present disclosure, preferably, the rotation speed of the low-speed stirring is 4,000±200 rpm.

According to some embodiments of the present disclosure, preferably, the conditions of the high-speed stirring include: the rotating speed is 12,000±500 rpm, and the time is 30-40 s.

The fifth aspect of the present disclosure provides a use of the cement slurry system provided by the third aspect, or the cement slurry system prepared with the method provided by the fourth aspect in the high temperature deep well cementing, and the long isolation section cementing under a large temperature difference condition.

The present disclosure will be described in detail below with reference to examples.

In the following Examples and Comparative Examples, each of the thickening properties parameter, a fluidity parameter, an API water loss parameter, a free water content parameter, a sedimentation stability parameter, and a compressive strength parameter is measured according to the National Standard GB/T 19139-2012 of China, namely "Testing method of well cements".

The cement was high sulphate-resistant G-grade oil well cement (hereinafter referred to as "GHSR oil well cement") produced by Jiahua Special Cement Co., Ltd.

Preparation Example 1

Aluminum salt (aluminum sulfate), sodium salt (sodium aluminate), crystal whisker (calcium carbonate crystal whisker), inorganic mineral (kaolin:halloysite=1:1), and dispersing agent I (the weight ratio of sulfonated aldehyde ketone polycondensate to methyl allyl alcohol polyoxyethylene ether-acrylic acid was 2:1) were uniformly mixed according to the weight ratio 2:1:4:5:1, an early strength material A1 was prepared.

Preparation Example 2

Aluminum salt (aluminum sulfate), sodium salt (sodium sulfate), crystal whisker (calcium sulfate crystal whisker), inorganic mineral (kaolin:halloysite=1:1), and dispersing agent I (the weight ratio of sulfonated aldehyde ketone polycondensate to methyl allyl alcohol polyoxyethylene ether-acrylic acid was 2:1) were uniformly mixed according to the weight ratio 3:2:3:4:1, an early strength material A2 was prepared.

Preparation Example 3

The early strength material was prepared according to the same method in the Preparation Example 1, except that the dispersing agent I (weight ratio of aldehyde ketone dispersant to polycarboxylic acid dispersant was 2:1) was replaced by the dispersing agent I (weight ratio of sulfonated aldehyde ketone dispersant to methyl allyl alcohol polyoxyethylene ether-acrylic acid was 3:1), an early strength material A3 was prepared.

Preparation Example 4

Aluminum salt (aluminum sulfate), sodium salt (sodium sulfate), crystal whisker (calcium carbonate crystal whisker), inorganic mineral (kaolin:feldspar=1:1), and dispersing agent I (weight ratio of sulfonated aldehyde ketone polycondensate to methyl allyl alcohol polyoxyethylene ether-acrylic acid was 2:1) were uniformly mixed according to the weight ratio of 5:0.5:5:10:1, an early strength material A4 was prepared.

Preparation Example 5

Aluminum salt (aluminum sulfate), sodium salt (sodium aluminate), crystal whisker (calcium carbonate crystal whisker), inorganic mineral (kaolin:spinel=1:1), and dispersing agent I (weight ratio of sulfonated aldehyde ketone polycondensate to methyl allyl alcohol polyoxyethylene ether-acrylic acid was 2:1) were uniformly mixed according to a weight ratio of 5:0:0.5:10:1, an early strength material A5 was prepared.

The physical property parameters of the cement slurry systems (S1-S7 and D1-D5) obtained in Examples 1-7 and Comparative Examples 1-5 were shown in Table 1.

Example 1

(1) 100 parts by weight of the GHSR oil well cement, 2.5 parts by weight of an early strength material A1, 35 parts by weight of a strength stabilizer (600 mesh acid-washed quartz sand, with a $SiO_2$ content of 99.6 wt %), 1 part by weight of a suspension stabilizer (carboxymethyl starch) and 0.7 part by weight of a dispersing agent II (formaldehyde acetone polycondensate) were mixed to obtain a dry blend;

(2) 2.5 parts by weight of a filtrate reducer (AMPS copolymer), 1 part by weight of a retarder (AMPS/IA copolymer), 0.2 part by weight of a defoaming agent (tributyl phosphate) and 49 parts by weight of water were mixed to obtain a wet blend;

(3) the dry blend was added to the wet blend under the stirring condition with a rotation speed of 4,000 rpm, obtained mixture was subsequently stirred at a rotation speed of 12,000 rpm for 35 seconds, a cement slurry system S1 was prepared.

The thickening curve of the cement slurry system S1 was shown in FIG. 1, as illustrated by FIG. 1, the initial thickening of the cement slurry system S1 containing the early strength material A1 was not obviously increased, the thickening curve was smooth, and there were no obvious phenomena of "bulging" and "raising step", it demonstrated that the addition of the early strength material A1 into the cement slurry system S1 had a small influence on the rheological property of the cement slurry and did not impose an adverse effect on the thickening curve of the cement slurry.

Example 2

(1) 100 parts by weight of the GHSR oil well cement, 2.8 parts by weight of an early strength material A1, 45 parts by weight of a powdered density modifier (concentrate iron powder with a density of 6.05 g/cm$^3$), 25 parts by weight of a strength stabilizer (600 mesh acid-washed quartz sand, with a $SiO_2$ content of 99.6 wt %), 1.5 parts by weight of a suspension stabilizer (xanthan gum) and 0.9 part by weight of a dispersing agent II (sodium polyvinyl sulfonate) were mixed to obtain a dry blend;

(2) 2.5 parts by weight of a filtrate reducer (AMPS copolymer), 0.6 part by weight of a retarder (AMPS/IA copolymer), 0.2 part by weight of a defoaming agent (tributyl phosphate) and 54 parts by weight of water were mixed to obtain a wet blend;

(3) the dry blend was added to the wet blend under the stirring condition with a rotation speed of 4,000 rpm, obtained mixture was subsequently stirred at a rotation speed of 12,000 rpm for 35 seconds, and a cement slurry system S2 was prepared.

Wherein the thickening curve of the cement system S2 was similar to that of FIG. 1.

Example 3

(1) 100 parts by weight of the GHSR oil well cement, 3 parts by weight of an early strength material A1, 45 parts by weight of a powdered density modifier (concentrate iron powder with a density of 6.05 g/cm$^3$), 30 parts by weight of a strength stabilizer (600 mesh acid-washed quartz sand, with a $SiO_2$ content of 99.6 wt %), 1.5 parts by weight of a suspension stabilizer (carboxymethyl starch) and 0.9 part by weight of a dispersing agent II (formaldehyde acetone polycondensate) were mixed to obtain a dry blend;

(2) 2.5 parts by weight of a filtrate reducer (AMPS copolymer), 0.6 part by weight of a retarder (AMPS/IA copolymer), 0.2 part by weight of a defoaming agent (tributyl phosphate) and 56 parts by weight of water were mixed to obtain a wet blend;

(3) the dry blend was added to the wet blend under the stirring condition with a rotation speed of 4,000 rpm, obtained mixture was subsequently stirred at a rotation speed of 12,000 rpm for 35 seconds, and a cement slurry system S3 was prepared.

Wherein the thickening curve of the cement system S3 was similar to that of FIG. 1.

Example 4

(1) 100 parts by weight of the GHSR oil well cement, 3.2 parts by weight of an early strength material A1, 45 parts by weight of a powdered density modifier (concentrate iron powder with a density of 6.05 g/cm$^3$), 35 parts by weight of a strength stabilizer (600 mesh acid-washed quartz sand, with a $SiO_2$ content of 99.6 wt %), 1.5 parts by weight of a suspension stabilizer (carboxymethyl starch) and 0.9 part by weight of a dispersing agent II (sulfonated aldehyde ketone polycondensate) were mixed to obtain a dry blend;

(2) 2.5 parts by weight of a filtrate reducer (AMPS copolymer), 0.6 part by weight of a retarder (AMPS/IA copolymer), 0.2 part by weight of a defoaming agent (tributyl phosphate) and 58 parts by weight of water were mixed to obtain a wet blend;

(3) the dry blend was added to the wet blend under the stirring condition with a rotation speed of 4,000 rpm, obtained mixture was subsequently stirred at a rotation speed of 12,000 rpm for 35 seconds, and a cement slurry system S4 was prepared.

Wherein the thickening curve of the cement system S4 was similar to that of FIG. 1.

Example 5

(1) 100 parts by weight of the GHSR oil well cement, 3.5 parts by weight of an early strength material A1, 115 parts by weight of a powdered density modifier (concentrate iron powder with a density of 6.05 g/cm³), 35 parts by weight of a strength stabilizer (600 mesh acid-washed quartz sand, with a $SiO_2$ content of 99.6 wt %), 1.5 parts by weight of a suspension stabilizer (carboxymethyl starch) and 0.9 part by weight of a dispersing agent II (methyl allyl alcohol polyoxyethylene ether-acrylic acid) were mixed to obtain a dry blend;

(2) 2.5 parts by weight of a filtrate reducer (AMPS copolymer), 0.5 part by weight of a retarder (AMPS/IA copolymer), 0.2 part by weight of a defoaming agent (tributyl phosphate) and 70 parts by weight of water were mixed to obtain a wet blend;

(3) the dry blend was added to the wet blend under the stirring condition with a rotation speed of 4,000 rpm, obtained mixture was subsequently stirred at a rotation speed of 12,000 rpm for 35 seconds, and a cement slurry system S5 was prepared.

Wherein the thickening curve of the cement system S5 was similar to that of FIG. 1.

Example 6

The cement slurry system was prepared with the same method as that of Example 2, except that in step (1), 2.8 parts by weight of the early strength material A1 was replaced with 2.8 parts by weight of the early strength material A2, the remaining conditions were identical, a cement slurry system S6 was prepared.

Example 7

The cement slurry system was prepared with the same method as that of Example 2, except that in step (1), 2.8 parts by weight of the early strength material A1 was replaced with 2.8 parts by weight of the early strength material A3, the remaining conditions were identical, a cement slurry system S7 was prepared.

Comparative Example 1

The cement slurry system was prepared with the same method as that of Example 1, except that in step (1), 2.5 parts by weight of the early strength material A1 was not added, the remaining conditions were identical, and a cement slurry system D1 was prepared.

Figure 2:
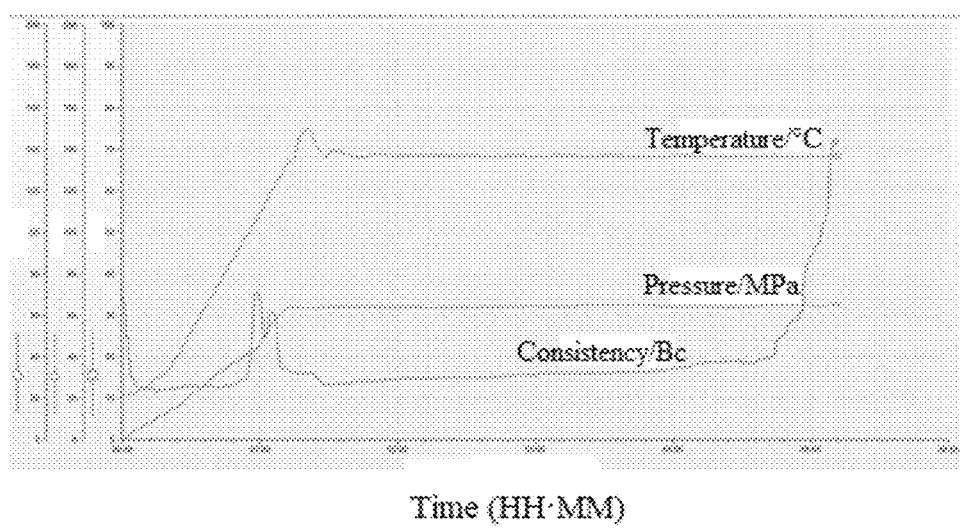
FIG. 2 illustrates a thickening curve of the cement slurry system D1 prepared in Comparative Example 1.

The thickening curve of the cement slurry system D1 was shown in FIG. 2, as illustrated by FIG. 2, the cement slurry system D1 exhibited the abnormal phenomena such as "bulging" and "raising step".

Comparative Example 2

The cement slurry system was prepared with the same method as that of Example 4, except that in step (1), 3.2 parts by weight of the early strength material A1 was not added, the remaining conditions were identical, and a cement slurry system D2 was prepared.

Comparative Example 3

The cement slurry system was prepared with the same method as that of Example 5, except that in step (1), 3.5 parts by weight of the early strength material A1 was not added, the remaining conditions were identical, and a cement slurry system D3 was prepared.

Comparative Example 4

The cement slurry system was prepared with the same method as that of Example 2, except that in step (1), the early strength material A1 was replaced with the early strength material A4, the remaining conditions were identical, a cement slurry system D4 was prepared.

Comparative Example 5

The cement slurry system was prepared with the same method as that of Example 2, except that in step (1), the early strength material A1 was replaced with the early strength material A5, the remaining conditions were identical, a cement slurry system D5 was prepared.

TABLE 1

| Items | | Example 1 | Example 2 | Example 3 | Example 4 | Example 5 | Example 6 |
|---|---|---|---|---|---|---|---|
| | Density, g/cm³ | 1.9 | 2.15 | 2.15 | 2.15 | 2.35 | 2.15 |
| | Fluidity, cm | 24 | 23 | 23 | 23 | 23 | 23 |
| | API water loss, mL | 34 | 42 | 40 | 41 | 45 | 43 |
| | Free water content | 0 | 0 | 0 | 0 | 0 | 0 |
| | Stability (density difference), g/cm³ | 0 | 0.02 | 0.02 | 0.02 | 0.03 | 0.02 |
| Thickening properties | Static temperature, ° C. | 150 | 130 | 140 | 150 | 150 | 130 |
| | Circulation temperature, ° C. | 135 | 110 | 120 | 135 | 135 | 110 |
| | thickening time, min | 335 | 327 | 335 | 348 | 362 | 335 |
| | Thickening linearity | Normal | Normal | Normal | Normal | Normal | Normal |
| Compressive strength | Top temperature, ° C. | 30 | 60 | 60 | 60 | 70 | 60 |
| | Top set cement compressive strength after 24 h, MPa | 5.7 | 15.5 | 12.4 | 10.3 | 3.9 | 13.5 |
| | Applicable temperature *, ° C. | 150 | 130 | 140 | 150 | 150 | 130 |
| | Temperature difference **, ° C. | 120 | 70 | 80 | 90 | 80 | 70 |

TABLE 1-continued

| Items | | Example 7 | Comparative Example 1 | Comparative Example 2 | Comparative Example 3 | Comparative Example 4 | Comparative Example 5 |
|---|---|---|---|---|---|---|---|
| Density, g/cm³ | | 2.15 | 1.9 | 2.15 | 2.35 | 2.15 | 2.15 |
| Fluidity, cm | | 22 | 24 | 23 | 23 | 21 | 23 |
| API water loss, mL | | 42 | 36 | 43 | 47 | 42 | 41 |
| Free water content | | 0 | 0 | 0 | 0 | 0 | 0 |
| Stability (density difference), g/cm³ | | 0.02 | 0.01 | 0.02 | 0.02 | 0.02 | 0.02 |
| Thickening properties | Static temperature, ° C. | 130 | 150 | 150 | 150 | 130 | 130 |
| | Circulation temperature, ° C. | 110 | 135 | 135 | 135 | 110 | 110 |
| | thickening time, min | 320 | 312 | 309 | 305 | 319 | 313 |
| | Thickening linearity | Normal | Normal | Normal | Normal | Normal | Normal |
| Compressive strength | Top temperature, ° C. | 60 | 30 | 60 | 70 | 60 | 60 |
| | Top set cement compressive strength after 24 h, MPa | 14.1 | 1.5 | 3.8 | 0 | 9.1 | 7.3 |
| Applicable temperature *, ° C. | | 130 | 150 | 150 | 150 | 130 | 130 |
| Temperature difference **, ° C. | | 70 | 120 | 90 | 80 | 70 | 70 |

Note:
* denoted static temperature of the thickening properties;
** denoted the difference between static temperature of the thickening properties and top temperature of the compressive strength.

As can be seen from Table 1, the cement slurry system provided by the present disclosure has a fluidity of more than or equal to 22 cm, an API water loss of less than 50 mL, a free water content being 0, and an adjustable density, and meets the requirements of well cementation construction.

The thickening time of the cement slurry systems prepared in Examples 1-7 of the present disclosure are adjustable, the thickening curves are normal, and the abnormal phenomena such as "bulging" do not exist; the test results of the set cement compressive strength demonstrate that: the top set cement compressive strength after 24 hours of the cement slurry systems in Examples is more than 3 MPa, the early strength is high, and the ultra-retarding problem of the top cement slurry does not occur.

Under the same experimental conditions, the API water loss of the Comparative Example 1 is 36 mL, the free water content is 0, and the density difference between the upper layer and the lower layer of the cement slurry after standing still for 2 hours is 0.01 g/cm³; the API water loss of the Comparative Example 2 is 43 mL, the free water content is 0, the density difference between the upper layer and the lower layer of the cement slurry after standing still for 2 hours is 0.02 g/cm³; the API water loss of the Comparative Example 3 is 47 mL, the free water content is 0, the density difference between the upper layer and the lower layer of the cement slurry after standing still for 2 hours is 0.02 g/cm³; the conventional properties of the cement slurry systems do not change significantly compared with those of Examples 1, 4 and 5, respectively.

0.6 part by weight of a retarder is added and the early strength material A1 is not added in Comparative Example 2; both the early strength material A1 and 0.6 part by weight of a retarder are added in Examples 2, 3, and 4 respectively. The experimental temperature of Comparative Example 2 is 135° C. and the thickening time is 309 min, the experimental temperature of Example 4 is 135° C. and the thickening time is 348 min, which is 12.62% longer than the thickening time of Comparative Example 2. Therefore, the addition of the early strength material provided by the present disclosure can effectively prolong thickening time of the comment past system under high-temperature condition.

The 24 hours top set cement compressive strength of Comparative Example 1 is 1.5 MPa, and the 24 hours top set cement compressive strength of Example 1 is 5.7 MPa, the 24 hours top set cement compressive strength of Example 1 is 280% higher than the 24 hours top set cement compressive strength of Comparative Example 1. The 24 hours top compression strength of Comparative Example 2 is 3.8 MPa, and the 24 hours top compression strength of Example 4 is 10.3 MPa, the 24 hours top set cement compressive strength of Example 4 is improved by 171.1% relative to the 24 hours top set cement compressive strength of Comparative Example 2. The 24 hours top compression strength of Comparative Example 3 is 0 MPa, and the 24 hours top compression strength of Example 5 is 3.9 MPa, the 24 hours top set cement compressive strength of Example 5 is significantly improved relative to the 24 hours top set cement compressive strength of Comparative Example 3. Therefore, the early strength material provided by the present disclosure can obviously improve the 24 hours top set cement compressive strength.

To sum up, the present disclosure provides a large-temperature-difference well cementation cement slurry system with an adjustable density (1.9-2.4 g/cm³), and a compressive strength of the top set cement after 24 h being larger than 3 MPa, an applicable temperature within a range from 30° C. to 150° C., and a temperature difference within a range from 30° C. to 120° C., the cement slurry system can significantly prolong thickening time of the cement slurry under the high-temperature, and reduce the addition amount of the retarder; the early strength of the top set cement is effectively improved, and the ultra-retarding is prevented; the cement slurry system can improve the rheological property of the cement slurry, has small thixotropy, and avoid the phenomena such as "bulging" and "raising step" in the thickening curve; the present disclosure has important significance for improving the well cementation quality and saving the well construction costs of the high-temperature deep well, and the long isolation section cementing under a large temperature difference condition.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A cement slurry system prepared from a cement slurry composition comprising: 100 parts by weight of cement, 1-5 parts by weight of an early strength material, 0.5-40 parts by weight of a strength stabilizer, 0-120 parts by weight of a density modifier, 0-2 parts by weight of a suspension stabilizer, 0-2 parts by weight of a dispersing agent II, 2-5 parts by weight of a filtrate reducer, 0.1-2 parts by weight of a retarder, 0.1-0.5 part by weight of a defoaming agent and 40-80 parts by weight of water;
   wherein the early strength material contains an aluminum salt, a sodium salt, a crystal whisker, an inorganic mineral, and a dispersing agent I; and the weight ratio of the aluminum salt, the sodium salt, the crystal whisker, the inorganic mineral and the dispersing agent I is (1-3):(1-3):(1-4):(1-8):1;
   wherein the cement slurry system has an applicable temperature within a range from 30° C. to 150° C. and a temperature difference within a range from 30° C. to 120° C.;
   wherein the cement slurry system has a density within a range from 1.9 g/cm³ to 2.4 g/cm³; a fluidity more than or equal to 22 cm; an API water loss less than 50 ml; a free water content being 0; a top set cement compressive strength after 24 hours being more than or equal to 3 MPa; and a thickening time more than or equal to 180 min.

2. The cement slurry system of claim 1, wherein the cement slurry system has a fluidity within a range from 22 cm to 24 cm; a top set cement compressive strength after 24 hours more than or equal to 5 MPa; and a thickening time within a range from 180 min to 400 min;
   and, the weight ratio of the aluminum salt, the sodium salt, the crystal whisker, the inorganic mineral and the dispersing agent I is (1-2):(1-2):(1-4):(1-5):1.

3. The cement slurry system of claim 1, wherein the aluminum salt is at least one selected from the group consisting of aluminum silicate, aluminum nitrate, aluminum chloride, aluminum sulfate, and aluminum trichloride;
   the sodium salt is at least one selected from the group consisting of sodium fluoride, sodium silicate, sodium metasilicate, sodium sulfate, sodium thiosulfate, sodium carbonate, sodium aluminate, sodium fluorosilicate, sodium oxalate, sodium hexametaphosphate, sodium tripolyphosphate, and sodium nitrate;
   the crystal whisker is at least one selected from the group consisting of calcium carbonate crystal whisker, alumina crystal whisker, calcium sulfate crystal whisker, silicon nitride crystal whisker, and magnesium sulfate crystal whisker;
   the inorganic mineral is two materials selected from the group consisting of kaolin, feldspar, zeolite, halloysite, spinel, montmorillonite, slag, and fly ash;
   the weight ratio of the two materials selected from the group consisting of kaolin, feldspar, zeolite, halloysite, spinel, montmorillonite, slag, and fly ash in the inorganic mineral is (0.5-2):1;
   and, the dispersing agent I is an aldehyde ketone dispersant and a polycarboxylic acid dispersant.

4. The cement slurry system of claim 3, wherein the weight ratio of the aldehyde ketone dispersant to the polycarboxylic acid dispersant in the dispersing agent I is (0.5-2):1.

5. The cement slurry system of claim 1, wherein the cement slurry composition comprises: 100 parts by weight of the cement, 1-3 parts by weight of the early strength material, 0.5-30 parts by weight of the strength stabilizer, 0-120 parts by weight of the density modifier, 0-1.5 parts by weight of the suspension stabilizer, 0-1 part by weight of the dispersing agent II, 2-4 parts by weight of the filtrate reducer, 0.1-1.5 parts by weight of the retarder, 0.1-0.5 part by weight of the defoaming agent and 40-80 parts by weight of water.

6. The cement system of claim 1, wherein the cement is G-grade oil well cement;
   the particle size distribution of the strength stabilizer is more than or equal to 600 mesh; and the strength stabilizer has a $SiO_2$ content larger than 99 wt. %.

7. The cement slurry system of claim 6, wherein the cement is high sulphate-resistant G-grade oil well cement;
   the particle size distribution of the strength stabilizer is within a range from 600 mesh to 2,400 mesh; and the strength stabilizer has a $SiO_2$ content within a range from 99.1 wt. % to 100 wt. %.

8. The cement slurry system of claim 1, wherein the strength stabilizer is at least one selected from the group consisting of acid-washed quartz sand, refined quartz sand, and high-purity quartz sand;
   the density modifier is concentrate iron powder having a density within a range from 5.05 g/cm³ to 7.2 g/cm³;
   and, the suspension stabilizer is selected from a modified starch stabilizer and/or a biopolymer stabilizer.

9. The cement slurry system of claim 1, wherein the dispersing agent II is at least one selected from the group consisting of an aldehyde ketone dispersant, a polycarboxylic dispersant, a formaldehyde acetone polycondensate and a polystyrene sulfonate;
   the filtrate reducer is a polyacrylamide polymer;
   the retarder is an acrylamide compound;
   and, the defoaming agent is at least one selected from the group consisting of tributyl phosphate, polyoxypropylene glycerol and polydimethylsiloxane.

10. The cement slurry system of claim 9, wherein the dispersing agent II is a formaldehyde acetone polycondensate and/or a polystyrene sulfonate.

11. A method of preparing the cement slurry system of claim 1, comprising the following steps:
   (1) subjecting cement, an early strength material, a strength stabilizer, a density modifier, a suspension stabilizer and a dispersing agent II to first mixing to obtain a dry blend;
   (2) subjecting a filtrate reducer, a retarder, a defoaming agent and water to second mixing to obtain a wet blend;
   (3) adding the dry blend into the wet blend under a low-speed stirring, then stirring obtained mixture at a high-speed to prepare a cement slurry system; wherein the early strength material contains an aluminum salt, a sodium salt, a crystal whisker, an inorganic mineral, and a dispersing agent I; and the weight ratio of the aluminum salt, the sodium salt, the crystal whisker, the inorganic mineral and the dispersing agent I is (1-3):(1-3):(1-4):(1-8):1;

wherein the cement slurry system has an applicable temperature within a range from 30° C. to 150° C. and a temperature difference within a range from 30° C. to 120° C.;

wherein the cement slurry system has a density within a range from 1.9 g/cm³ to 2.4 g/cm³; a fluidity more than or equal to 22 cm; an API water loss less than 50 ml; a free water content being 0; a top set cement compressive strength after 24 hours being more than or equal to 3 MPa; and a thickening time more than or equal to 180 min.

12. The method of claim 11, wherein the cement slurry system has a fluidity within a range from 22 cm to 24 cm; a top set cement compressive strength after 24 hours more than or equal to 5 MPa; and a thickening time within a range from 180 min to 400 min;

the weight ratio of the cement, the early strength material, the strength stabilizer, the density modifier, the suspension stabilizer and the dispersing agent II in step (1) is 100:(1-5):(0.5-40):(0-120):(0-2):(0-2);

the weight ratio of the filtrate reducer, the retarder, the defoaming agent and water in step (2) is (2-5):(0.1-2):(0.1-0.5):(40-80);

the weight ratio of the cement in the dry blend to the filtrate reducer in the wet blend in step (3) is 100:(2-5);

the rotation speed of the low-speed stirring is 4,000±200 rpm;

and, the conditions of the high-speed stirring include: the rotating speed is 12,000±500 rpm, and the time is 30-40 s.

13. The method of claim 12, wherein the weight ratio of the cement, the early strength material, the strength stabilizer, the density modifier, the suspension stabilizer and the dispersing agent II in step (1) is 100:(1-3):(0.5-30):(0-120):(0-1.5):(0-1);

the weight ratio of the filtrate reducer, the retarder, the defoaming agent and water in step (2) is (2-4):(0.1-1.5):(0.1-0.5):(40-80);

and, the weight ratio of the cement in the dry blend to the filtrate reducer in the wet blend in step (3) is 100:(2-4).

\* \* \* \* \*